(12) United States Patent
Abu-Shaikha

(10) Patent No.: US 9,129,533 B2
(45) Date of Patent: Sep. 8, 2015

(54) VALVE AND VALVE EXTENSION

(71) Applicant: Jamil Abu-Shaikha, Springfield, VA (US)

(72) Inventor: Jamil Abu-Shaikha, Springfield, VA (US)

(*) Notice: Subject to any disclaimer, the term of this patent is extended or adjusted under 35 U.S.C. 154(b) by 0 days.

(21) Appl. No.: 14/019,905

(22) Filed: Sep. 6, 2013

(65) Prior Publication Data
US 2014/0264119 A1 Sep. 18, 2014

Related U.S. Application Data

(60) Provisional application No. 61/798,732, filed on Mar. 15, 2013.

(51) Int. Cl.
*F16K 31/60* (2006.01)
*G09B 19/00* (2006.01)
*F16K 31/46* (2006.01)

(52) U.S. Cl.
CPC .............. *G09B 19/00* (2013.01); *F16K 31/60* (2013.01); *F16K 31/46* (2013.01); *Y10T 137/87917* (2015.04)

(58) Field of Classification Search
CPC ... F16K 31/46; F16K 31/60; Y10T 137/5109; Y10T 137/87917; Y10T 137/87925; Y10T 137/9464; Y10T 137/85946
USPC .............. 251/292, 293; 4/661; 137/269, 562, 137/613, 614, 801
See application file for complete search history.

(56) References Cited

U.S. PATENT DOCUMENTS

| | | | | |
|---|---|---|---|---|
| 1,410,846 | A * | 3/1922 | Stewart | 123/556 |
| 3,582,116 | A * | 6/1971 | Young | 403/359.1 |
| 4,266,320 | A * | 5/1981 | Grant | 16/427 |
| 5,639,063 | A * | 6/1997 | Barker | 251/148 |
| 5,711,511 | A * | 1/1998 | Cynar | 251/293 |
| 6,805,154 | B1 * | 10/2004 | Dickey et al. | 137/360 |
| 6,959,914 | B1 * | 11/2005 | Corral | 251/293 |
| 7,000,897 | B2 * | 2/2006 | Chick | 251/293 |
| 2014/0103242 | A1 * | 4/2014 | Leighton | 251/293 |

* cited by examiner

*Primary Examiner* — Matthew W Jellett
(74) *Attorney, Agent, or Firm* — Patwrite Law; Mark David Torche

(57) ABSTRACT

A combination valve and valve extension allows an operator to open and close a hose bib. A ball valve attaches to the free end of a hose bib. An extension member includes a coupling end that slides over the handle of the ball valve. A handle is provided at an opposite end of the extension member to allow torque to be exerted on the ball valve handle to open and close it. In this manner, a simple and cost effective method of controlling a hose bib without incurring many of the problems associated with bushes planted in front of the hose.

8 Claims, 6 Drawing Sheets

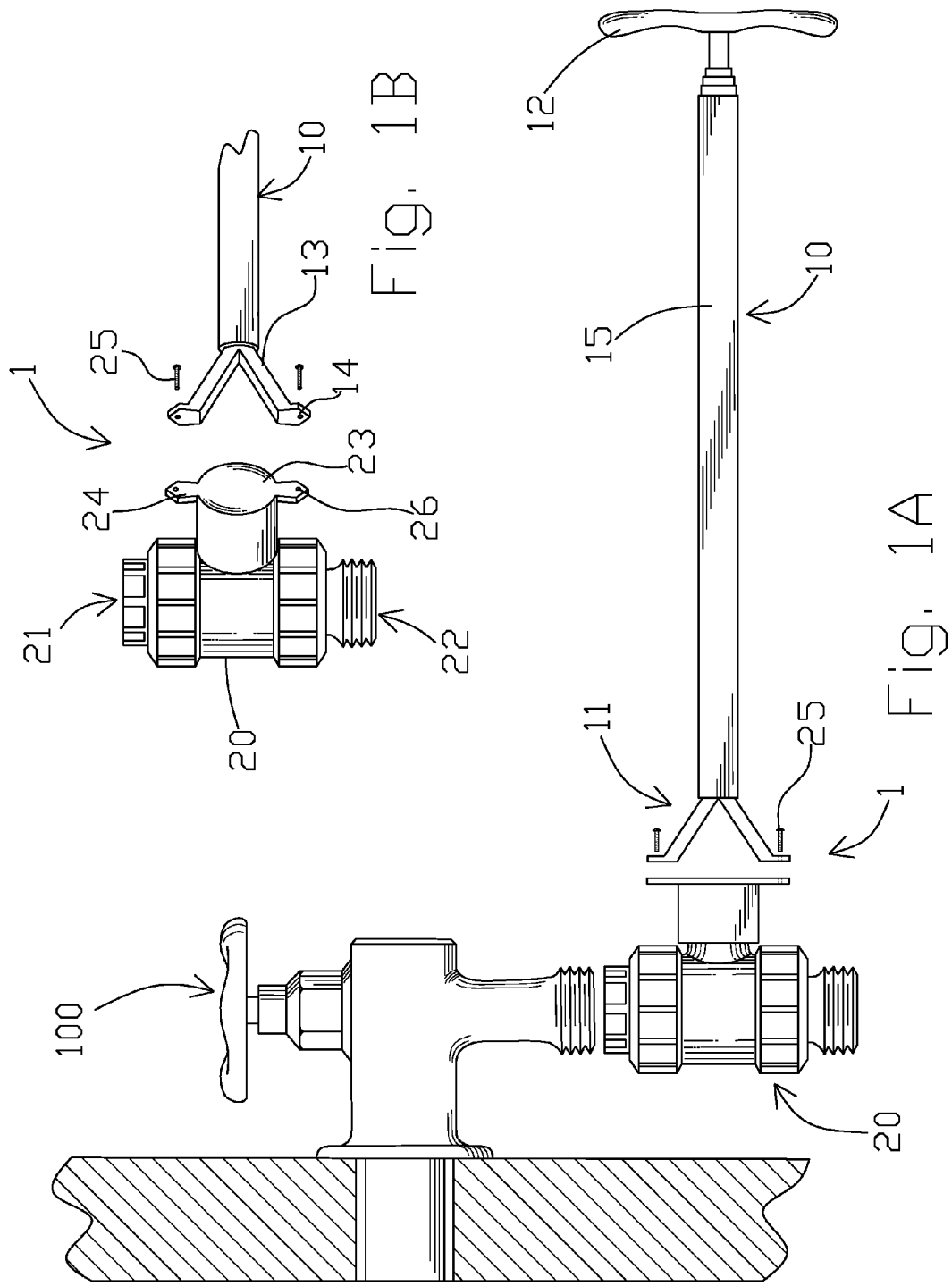

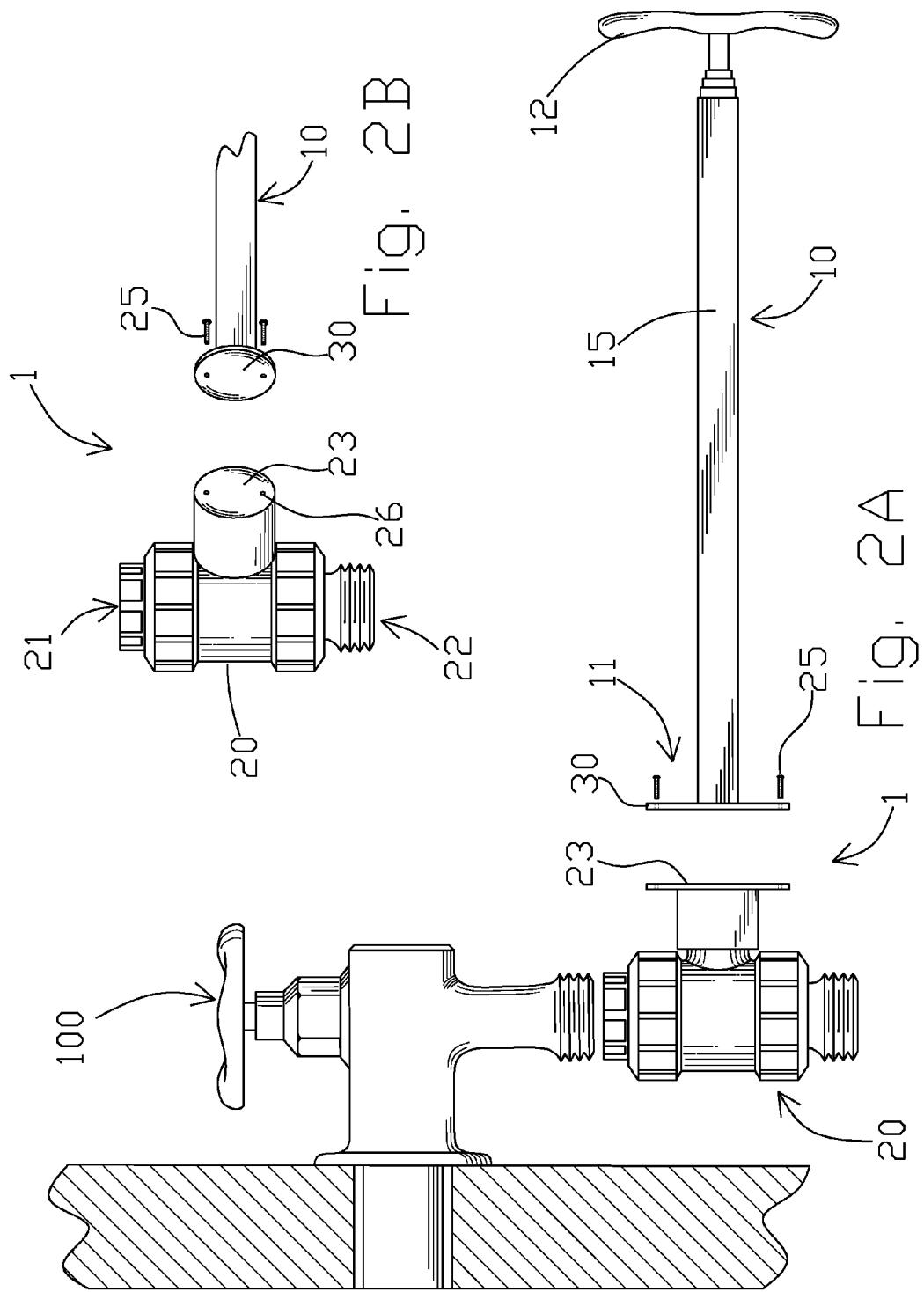

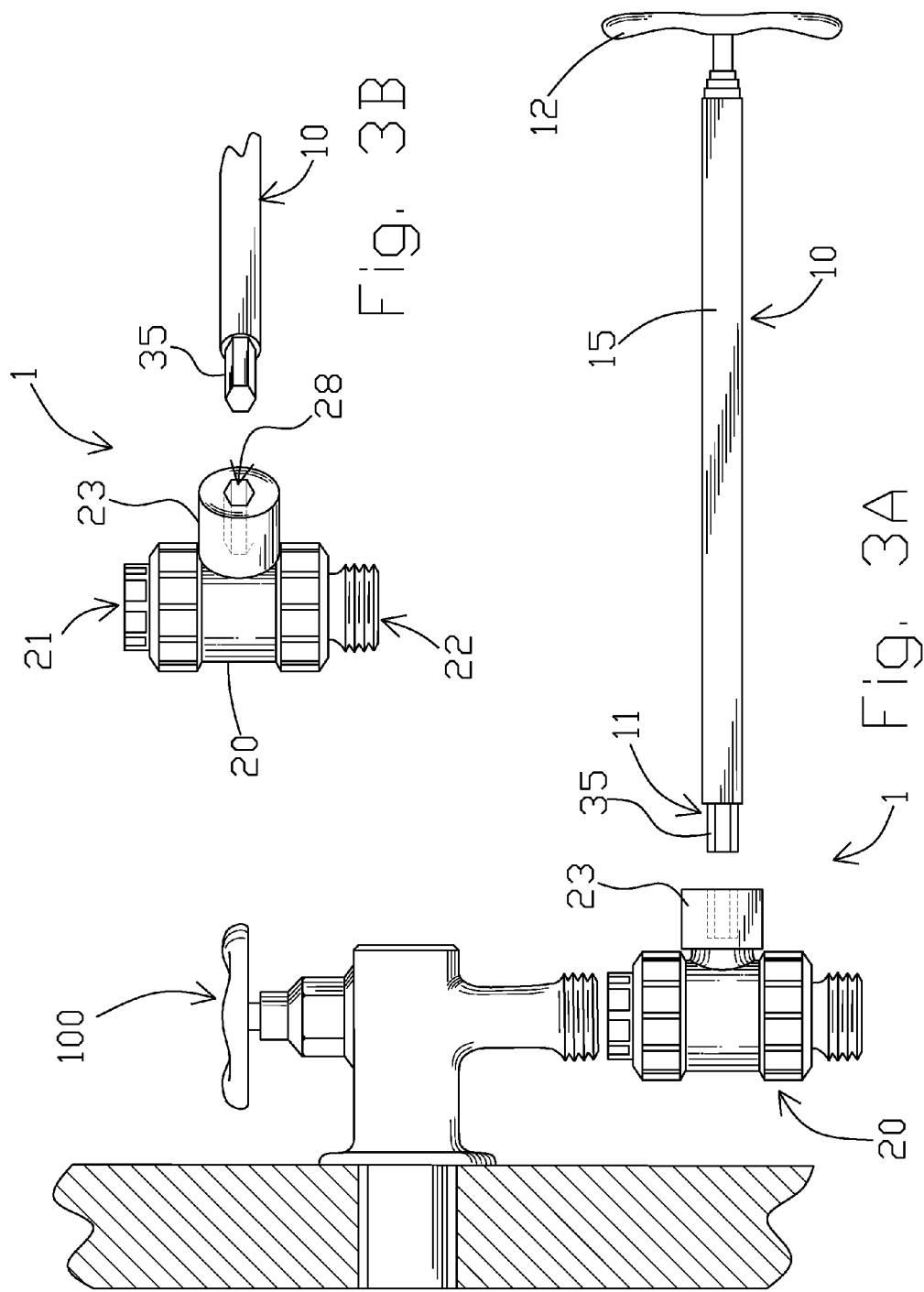

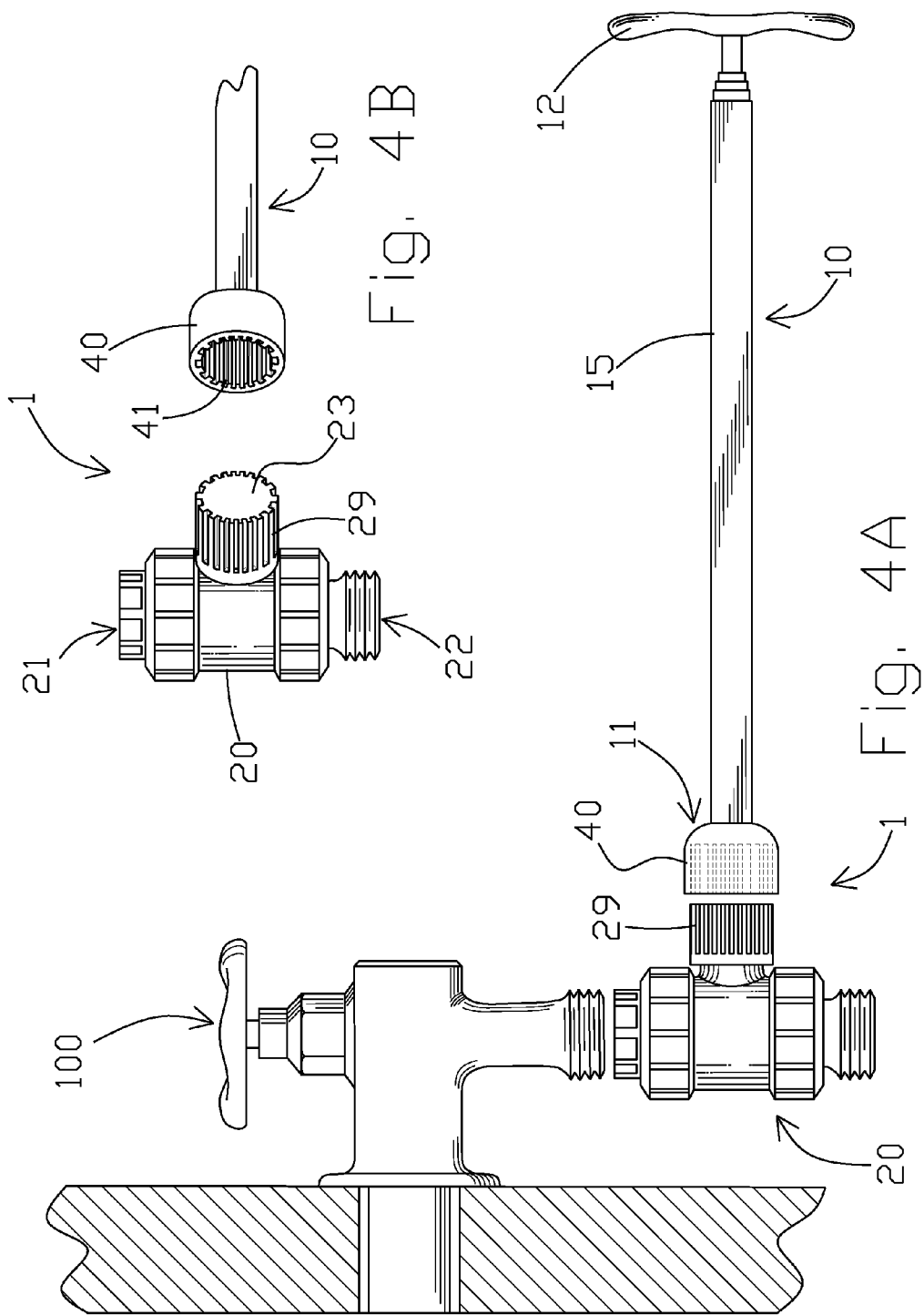

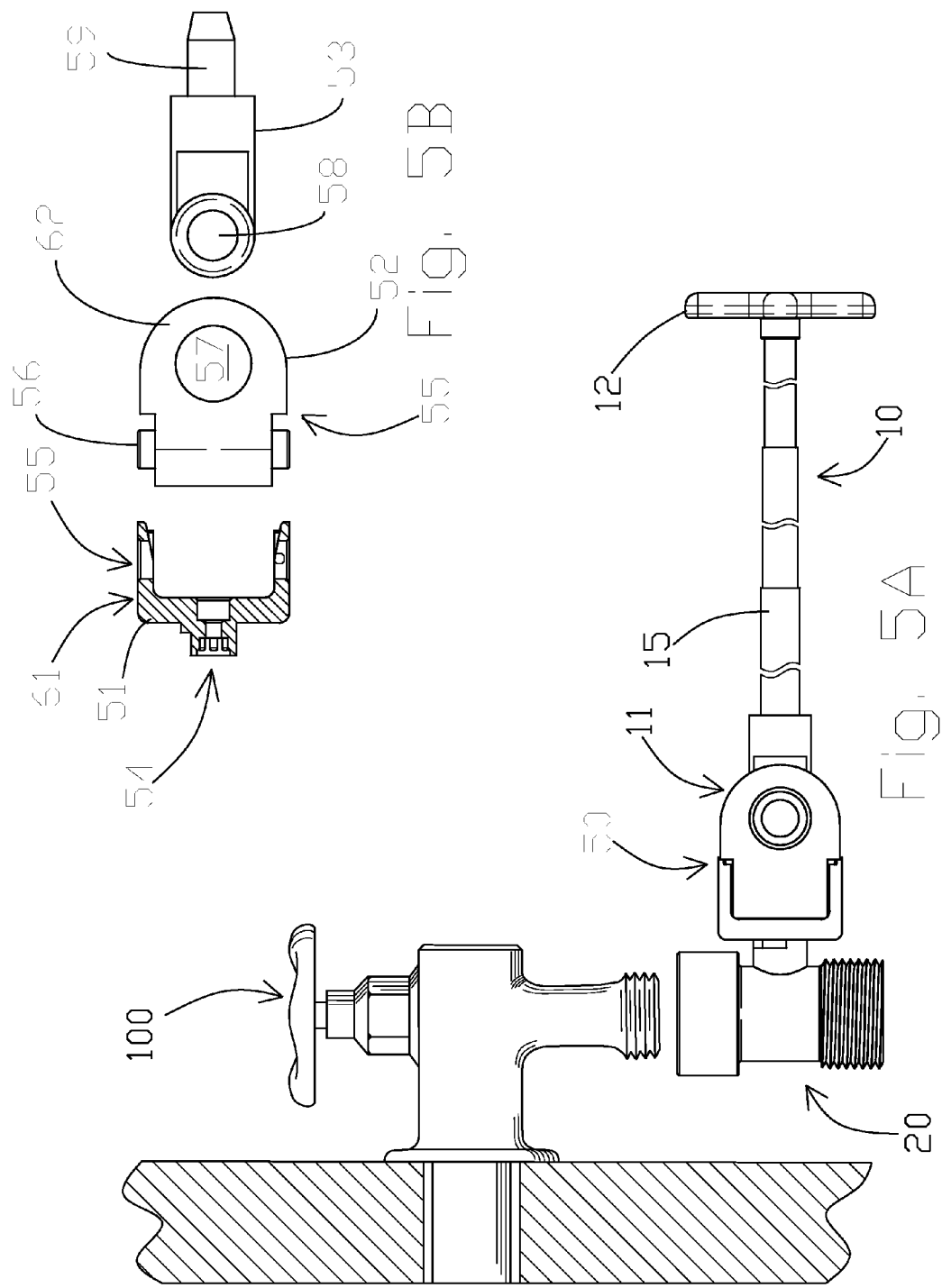

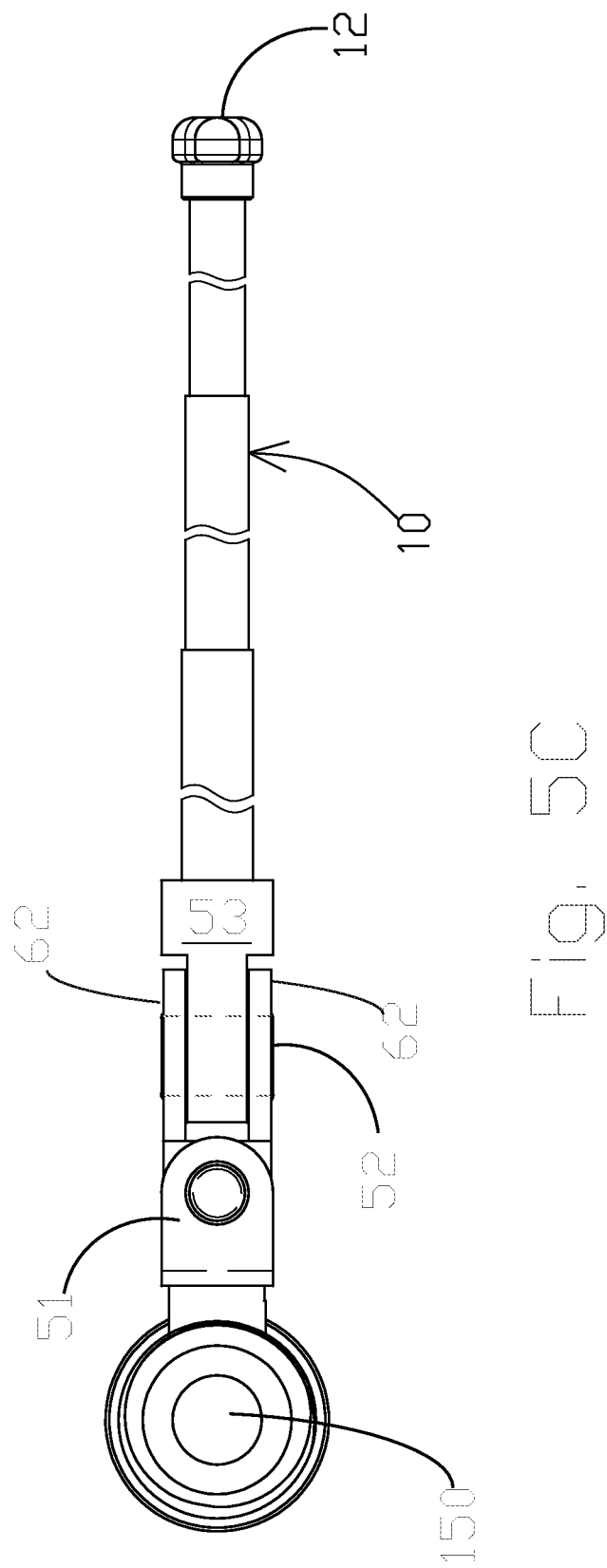

VALVE AND VALVE EXTENSION

The present application relates to U.S. Provisional Patent Application Ser. No. 61/796,732 filed on Nov. 19, 2012 and claims priority therefrom.

The present application was not subject to federal research and/or development funding.

TECHNICAL FIELD

Generally, the invention relates to a combination valve and valve extension which allows an exterior water valve or spigot to be turned on or shut off from a distance. That is, the invention is coupled to an exterior hose bib and allows the hose bib to be remotely controlled in an easy fashion.

BACKGROUND OF THE INVENTION

There are several valve types which include globe valves, gate valves, ball valves, and butterfly valves. Globe valves are typically used in hose bibs which are found on the outside of almost every American house to control the flow of water. In a globe valve, a rubber or neoprene washer is attached to a handle to cover a water supply opening and shut off the water when the handle is screwed down. Gate valves include a handle coupled to a wedge that is arranged within housing. A valve stem extends between the handle and the wedge and includes a threaded region passing through the housing. The handle of the gate valve is rotated several twists to open and close the valve by retracting or extending the wedge into a conduit extending between the input and output of the valve.

A ball valve utilizes a ball for controlling the flow of fluid through the valve. An opening passes through the center of the ball and allows fluid to pass through the valve when the opening is parallel to the conduit. When the ball is rotated ninety degrees, the solid region of the ball fills the conduit to close the valve.

A hose bib is provided on the exterior of many American homes. The hose bib usually includes either a globe valve or a gate valve. This requires the user to rotate the hose bib handle several revolutions to fully open and close the hose bib. Moreover, many homeowners plant bushes near the hose bib. It becomes difficult to turn on/off the hose bib as the bushes grow. If the bushes are watered, mud puddles may form making it difficult to operate the hose bib.

By way of example, there are several patents which have attempted to address the issue of extending valves. U.S. Pat. No. 4,266,320 discloses a faucet extender that includes an elongated extension member and a connection arrangement that couples the faucet extender to a valve handle. A handle is provided on the elongated extension member for transmitting rotation to the valve handle. A vertical support member is arranged near the handle for includes a lower end adapted to be driven into the ground.

U.S. Pat. No. 5,711,511 discloses a garden hose valve spindle extender that comprises an elongated rod which includes a first end having a knob and a second end having an attachment plate. The attachment plate is secured to an existing water spigot. A securement hook attaches the elongated rod to an exterior of the house. The extender lengthens the valve handle upwards such that the user does not have to bend over to actuate the garden hose valve.

U.S. Pat. No. 6,186,475 discloses a spigot handle extender which extends a valve handle. The extender includes a rotateable body and engaging means for engaging a valve handle to be rotatable conjointly therewith.

U.S. Pat. No. 6,837,481 discloses an emergency multipurpose valve extension for use with utility control valves. The extension is for use in toilets, sinks and water heaters. The extension makes it easier for a user to turn on and off the water supply to a particular item and assists elderly and disabled in doing such.

U.S. Pat. No. 7,000,897 discloses an apparatus and method for operating a water valve. A water meter valve wrench comprises a telescoping shaft assembly having an inner and outer shaft. A handle is pivotally attached to a first end of the shaft assembly. A working coupling element is fixed or mounted onto the other end.

One problem associated with watering the lawn or washing the car is that many homeowners plant bushes near their home. This may cause a muddy spot when the law is watered or scratch a home owner who enters the bushes to turn on/off a hose bib.

SUMMARY OF THE INVENTION

The present invention is a combination valve and extender. The valve is preferably valve that opens and closes by turning the valve handle over a small distance. Such valves are known in the art as ball valves and butterfly valves. These types of valves are operated by turning the valve handles only a short distance, for instance a one-quarter turn. A valve extender comprises an elongated member having a first end with a handle and a second end that is preferably comprises a forked end having angled prongs that slip on either side of the valve handle to turn it on and off. Various other embodiments of the invention include a valve having different couplers that attach the handle thereto as shown in the different views. One embodiment comprises a coupler having a pair of yokes linked together with pins and which adjoins the handle to the valve such that two axis of rotation are provided to allow the handle to be elevated and traversed simultaneously.

The valve includes an internally threaded open end which allows it to be attached onto a hose bib that extends from the house exterior. An opposite end includes external threads that receive and mate with a hose. During operation, the closed valve is attached to the hose bib. The hose bib handle is opened to allow pressurize water to enter the valve. In one embodiment, the forked end is temporarily slid onto the valve handle and twisted to turn the water on. In like manner, the water may be turned off. This allows the user to stand on a side of a bush opposite the house and operate the valve without pushing through the bush and into moist soil or mud.

In one embodiment, the shutoff valve includes a handle comprising specially formed closure wings that hook to an expandable handle that attach to a hose bib or other water faucet. An end of a water hose connects to an opposite end of the shutoff valve. The valve is substantially 1½ inches in length and comprises female threads at one end for attaching to the externally threaded end of the hose bib. A ball arranged within the valve is controlled by the valve wings and handle to control a flow of water through the shutoff valve. The handle and valve may be formed from a variety of different materials readily available on the market such as chrome, brass, composite, plastic or other lightweight sturdy materials.

The invention is a very convenient way to be able to turn on/off outdoor hose bibs and faucets without stepping into flower beds or through bushes to accomplish the task. The invention may also comprise a u-shaped hook that loosely attaches to the valve with an end attached to the handle such that the handle rests close to or on the ground when not in use. Another option includes a ground stake on which the handle rests.

It is an object of the invention to teach a hose bib extension that enables a user to open and close the hose bib without having to walk through bushes planted near the house.

An additional object of the invention is to provide an extended elongated member which includes a handle for easily turning water on/off at a hose bib.

It is another object of the invention to teach a cost effective solution to a common problem experienced by the American homeowner.

It is a further object of the invention to teach a simple solution to assist a homeowner in conveniently watering his lawn or washing his car.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in this specification and any appended claims.

BRIEF DESCRIPTION OF THE DRAWINGS

FIG. 1A shows a schematic view of a first embodiment of a combination valve and valve extender along with a hose bib. FIG. 1B is an enlarged view of the valve and valve extender shown in FIG. 1A.

FIG. 2A shows a schematic view representing a second embodiment of the combination valve and valve extender along with a hose bib. FIG. 2B is an enlarged view of the valve and valve extender shown in FIG. 2A.

FIG. 3A depicts a third schematic view showing an embodiment of a combination valve and valve extender along with a hose bib. FIG. 3B is an enlarged view of the valve and valve extender shown in FIG. 3A.

FIG. 4A shows a fourth schematic embodiment of a combination valve and valve extender along with a hose bib. FIG. 4B is an enlarged view of the valve and valve extender shown in FIG. 4A.

FIG. 5A shows a fifth schematic embodiment of a combination valve and valve extender along with a hose bib. FIG. 5B is an enlarged exploded view of a dual directional coupler. FIG. 5C shows the fifth embodiment from above.

DETAILED DESCRIPTION OF THE INVENTION

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims.

Moreover, it is noted that like reference numerals represent similar parts throughout the several views of the drawings.

Turning now to the invention, FIGS. 1A, 1B are views of the first embodiment of the invention 1. A quick actuation valve 20 such as a ball or butterfly valve is attached to the threaded output end of a hose bib 100. The quick actuation valve 20 includes a body formed of a rigid material and having a first end 21 which comprises a collar having female hose threads that mates with the external threads on a hose bib. The collar is constructed to allow it to rotate relative to the body of the valve 20. It should be noted that the valve 20 may comprise threads that mate with external threads on a sink faucet or other interior water dispensing device. An O-ring 150 shown in FIG. 5C is seated within the collar for preventing leaks between the threaded end of the hose bib and the collar. A second end 22 includes external hose threads for accepting a garden or yard hose.

The quick actuation valve 20 is installed by mating the threaded collar onto the output end of the hose bib 100. Thereafter, the valve 20 is closed and the handle of hose bib 100 is twisted into the open position allowing water pressure to build within valve 20.

A proximal end of the elongated member 10 includes a handle 12. In the first embodiment, a distal end 11 of elongated member 10 includes a pair of prongs 13. Each prong 13 includes a flat end 14. Each flat end 14 includes at least one through opening for accepting fastener 25 to affix a distal end of the elongated member 10 to a valve stem 23 of valve 20 via threaded openings 26 in ears 24 which extend outward from valve stem 23.

Elongated member 10 further comprises a plurality of nested members, collectively represented as element 15 in the drawings and which telescope to a length of substantially five feet (5'). Each nested member is configured to transfer torque between handle 12 and prongs 13 to allow for the valve stem 23 to be twisted from an open to a closed position and vice versa.

During operation, the elongated member 10 may be passed through a bush and extended during use and semi-collapsed back into the bush during nonuse. As can be realized, the handle 12 can be twisted to exert torque onto the valve stem 23 to turn it a short distance, preferably ninety degrees to actuate the valve 20. In this manner, one is not required to enter into bushes to perform lawn and plant irrigation operations. Crimps may be provided along each of the elements 15 to ensure torque transfer between the handle 12 and valve stem 23.

FIG. 2A, 2B show a second embodiment of the invention. In this instance, the distal end of the elongate member 10 comprises a circular member 30 having two through holes. Fasteners 25 pass through the through holes and into threaded openings 22 in valve stem 23 to fasten the distal end 11 of the elongated member 10 to the valve 20. The operation of this embodiment is essentially the same as that mentioned above with respect to FIG. 1A, 1B.

FIG. 3A, 3B show a third embodiment of the invention. The distal end 11 includes a machined portion, in this instance, a hexagon shaped end 35, that mates with a complementary shaped recess 28 of the valve stem. The user inserts end 35 into recess 28 to turn the valve 20 on/off. The operation of this embodiment is the same as mentioned above.

FIG. 4A, 4B show a fourth embodiment of the invention. The valve stem 23 includes a plurality of undulations 29 which mate with complementary undulations 41 arranged with recess 40. The valve operation is the same as mentioned previously.

FIGS. 5A-5C show a fifth embodiment of the invention which comprises a coupler 50 having a pair of yokes 51, 52 linked together with pin 56 and which includes coupling end 53 that adjoins the distal end 11 of the elongated member 10 to the valve stem in a manner such that two axis of rotation are provided to allow the handle to be elevated and traversed simultaneously. This simultaneous movement ability coupled with the telescoping features of the elongated member provides a universal three dimensional adjustment ability to the instant invention.

First yoke 51 comprises a recess 54 having a plurality of undulations which are complementary of those shown on the valve stem (not shown in FIG. 5A) and similar to those indicated in FIGS. 4A, 4B. The body of yoke 51 includes a pair of ears 61 having openings 55 through which pin 56 couples the yokes 51, 52 together. The second yoke 52 also includes a pair of ears 62 having an opening into which pin 57 is seated. Pin 57 passes through opening 58 of coupling end 53 to it to the second yoke 52. Coupling end 53 includes a cylindrical end 59 which is seated in the distal end 11 of elongated member 10. In this manner, the handle may be raised to a desired elevation and traversed left and right of the hose bib. It should be noted that coupling end 53 is flexible and not attached to ears 62 other than with the pin 57 to allow it to move up/down freely.

It is to be understood that the invention is not limited to the exact construction illustrated and described above. Various changes and modifications may be made without departing from the spirit and the scope of the invention as defined in the following claims. For instance, the various the coupler having yokes and shown in FIGS. 5A-5C may be modified to include the various ends that mate with the valve stem of the embodiments shown in FIGS. 1-4.

I claim:

1. A combination valve and valve extension comprising:
a quick actuation valve attached in series to a faucet, said quick actuation valve including a body having a valve stem arranged therein for controlling a flow of water there through, said quick actuation valve having a first end which comprises a collar having female threads that mates with external threads on the faucet, said collar rotates relative to the body of the quick actuation valve, said quick actuation valve having an 0-ring seated within the collar for preventing leaks between the water dispensing device and the collar, a second end of said quick actuation valve including external threads;
a water hose connected having a collar which is attached to the external threads on the second end of the quick actuation valve;
an elongated member having a proximal end and a distal end and comprising a plurality of nested members, each nested member being configured to transfer torque between the proximal end and the distal end such that the valve stem is twisted from an open to a closed position and from a closed to an open position;
a coupler;
said coupler having a first yoke and a second yoke;
said first yoke having an recess end;
said recess end configured to attach to said valve stem wherein said valve stem is operable between said closed position and said open position;
said first yoke having a first pair of ears;
said second yoke having an insert end;
said insert end is rotatably secured within said first pair of ears with a first pin; wherein said second yoke rotates in a first plane around said first pin;
a coupling end;
said coupling end having an opening end and a cylindrical end;
said second yoke having a second pair of ears which is distally offset from said insert end;
said opening end of said coupling end is rotatably secured within said second pair of ears with a second pin; wherein said coupling end rotates in a second plane perpendicular and offset from said first plane;
said cylindrical end being adapted to fit within said proximal end of said elongated member wherein said cylindrical end is secured therein; and,
a handle fastened at the proximal end of the elongated member.

2. The combination valve and valve extension of claim 1 wherein said distal end of the elongated member includes a pair of prongs, each prong includes a flat end that includes at least one through opening for accepting a fastener to affix the distal end of the elongated member to the valve stem via threaded openings provided in ears which extend outward from the valve stem.

3. The combination valve and valve extension of claim 1 wherein said distal end of the elongate member comprises a circular member having two through holes and having a fastener pass through each of the through holes and into threaded openings in the valve stem to fasten the distal end of the elongated member to the valve stem.

4. The combination valve and valve extension of claim 1 wherein said distal end of the elongated member includes a machined portion that mates with a complementary shaped recess of the valve stem.

5. The combination valve and valve extension of claim 4 wherein the valve stem includes a plurality of undulations which mate with complementary undulations arranged on the distal end of the elongated member.

6. The combination valve and valve extension of claim 1 wherein said elongated member telescopes to a length of substantially five feet.

7. The combination valve and valve extension of claim 1 wherein said distal end of the elongated member includes a machined portion that mates with a complementary shaped recess of the valve stem.

8. The combination valve and valve extension of claim 7 wherein the valve stem includes a plurality of undulations which mate with complementary undulations arranged on the distal end of the elongated member.

* * * * *